A. KADOW.
GLASS BLOWING MACHINE.
APPLICATION FILED NOV. 18, 1912.
1,248,664.
Patented Dec. 4, 1917.
15 SHEETS—SHEET 2.
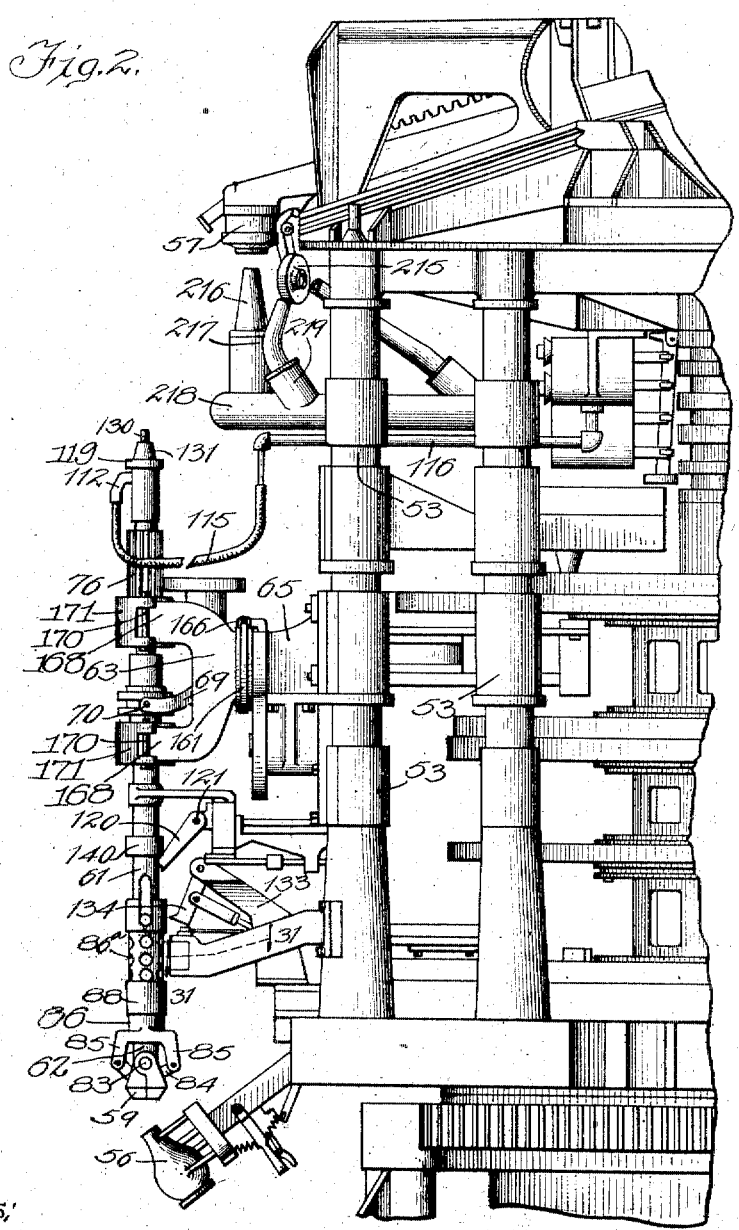

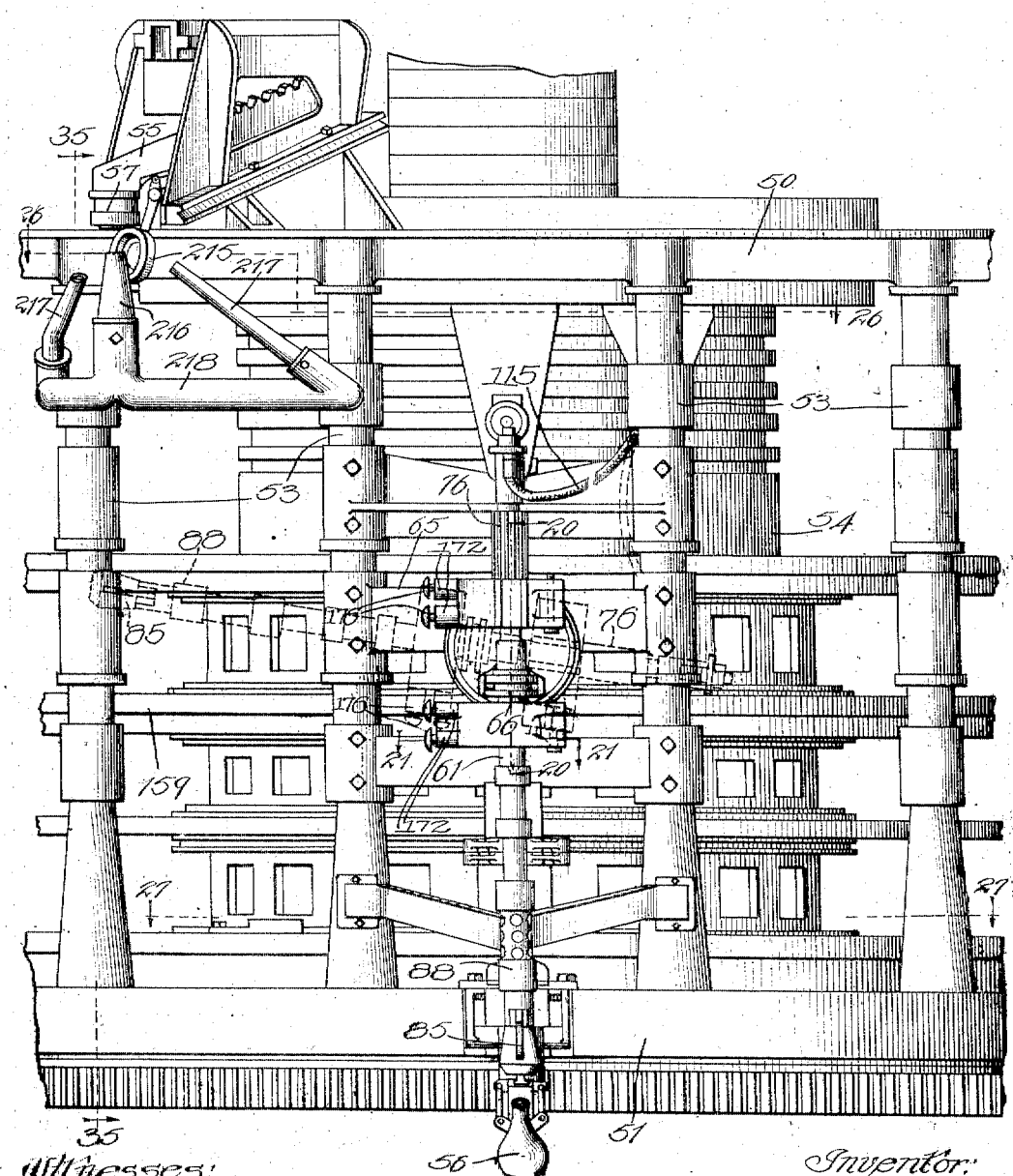

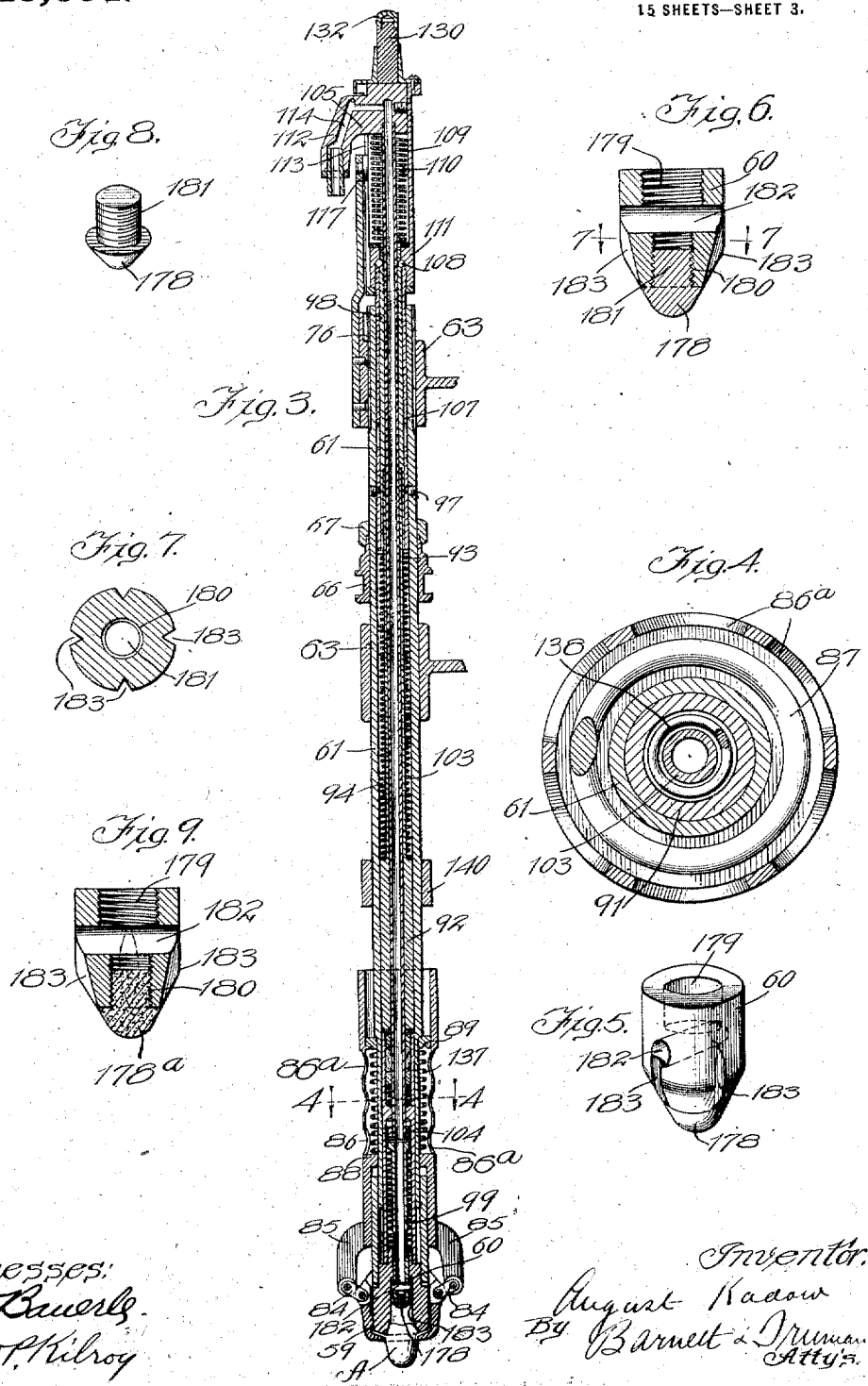

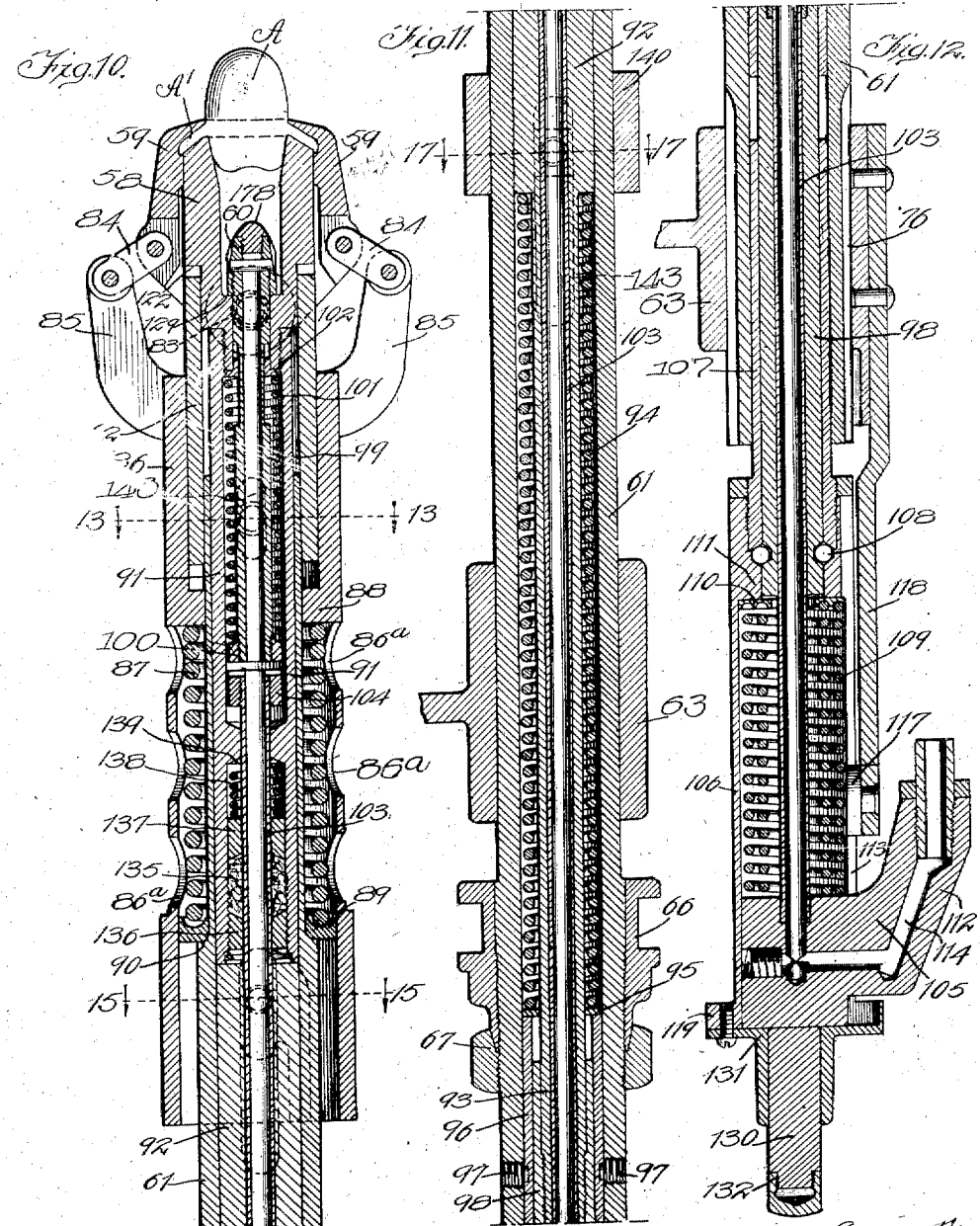

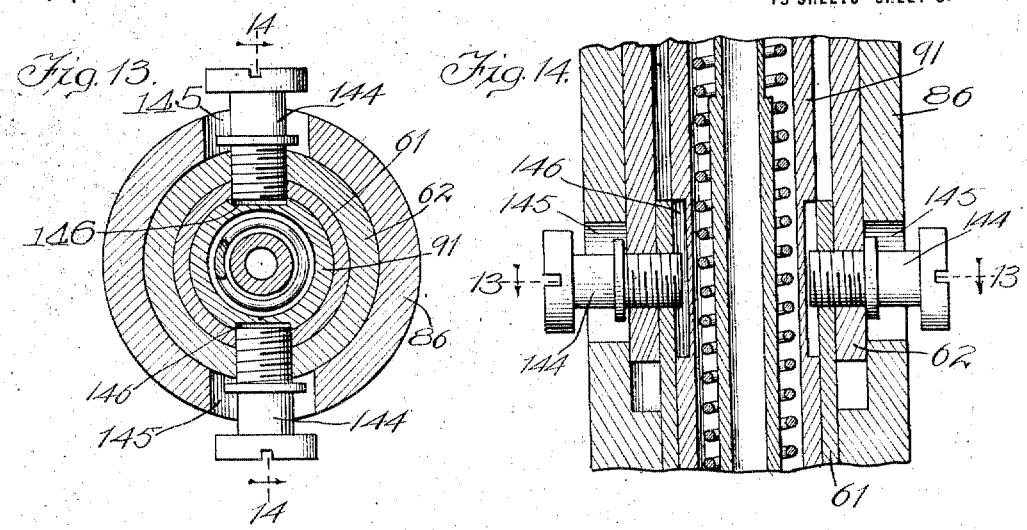
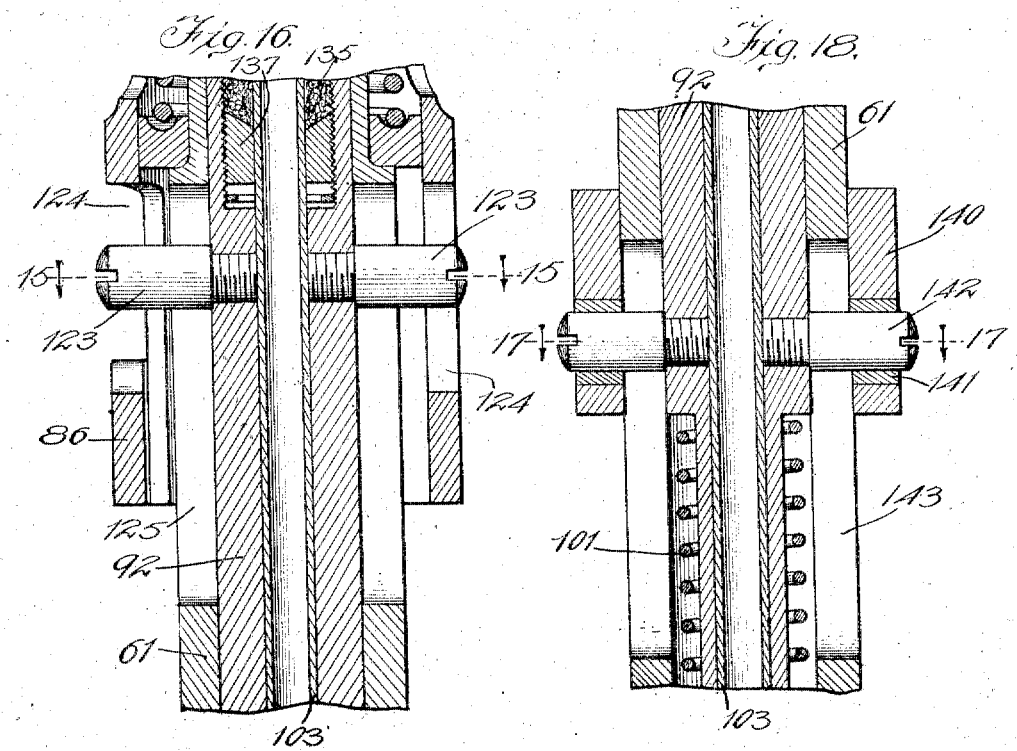

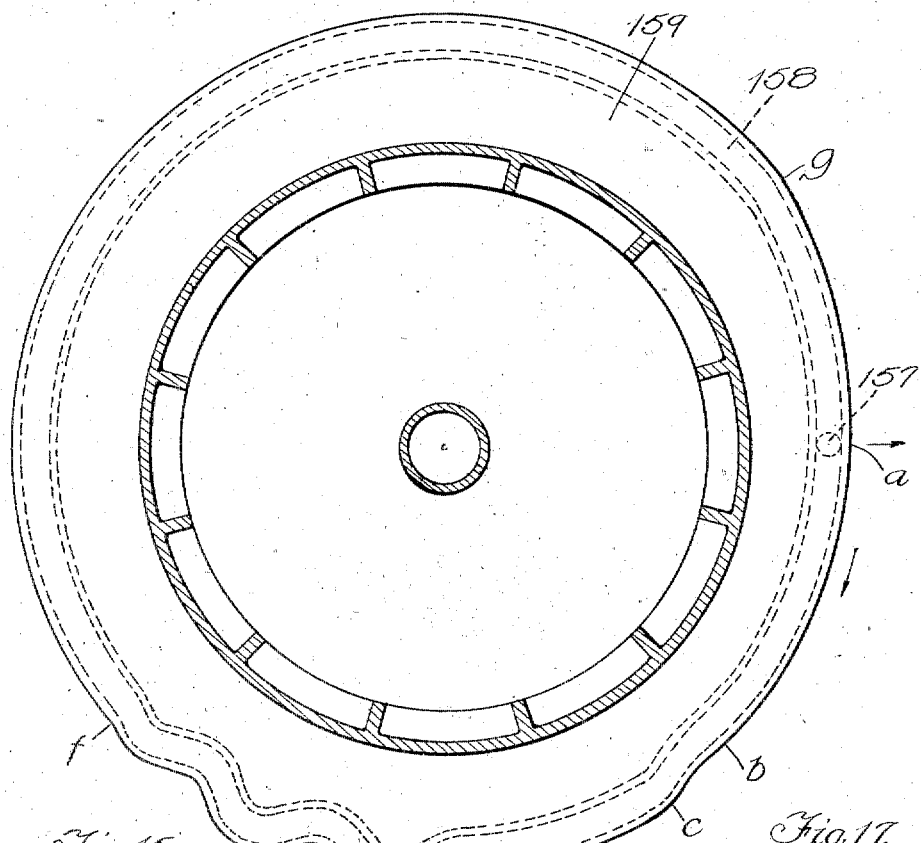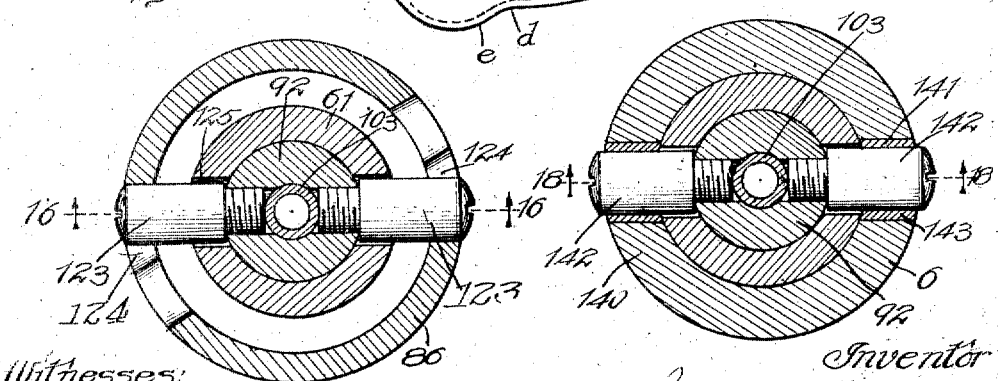

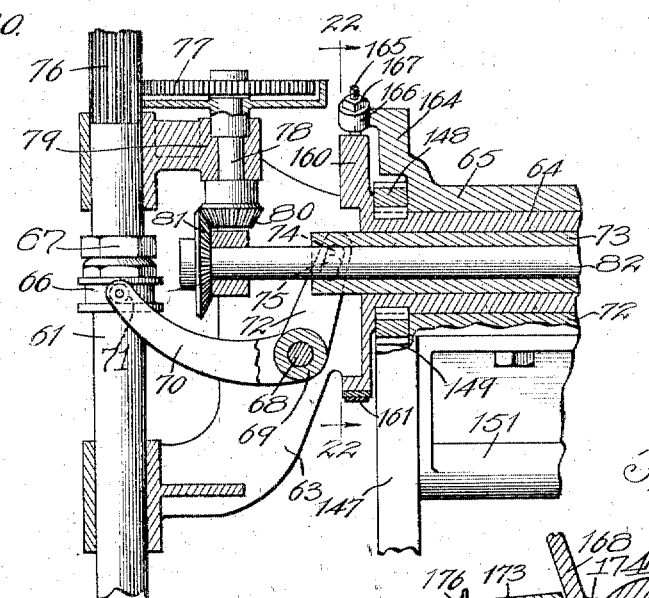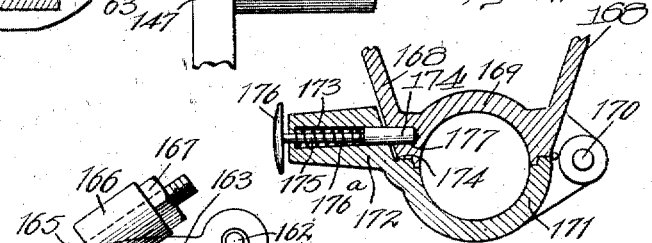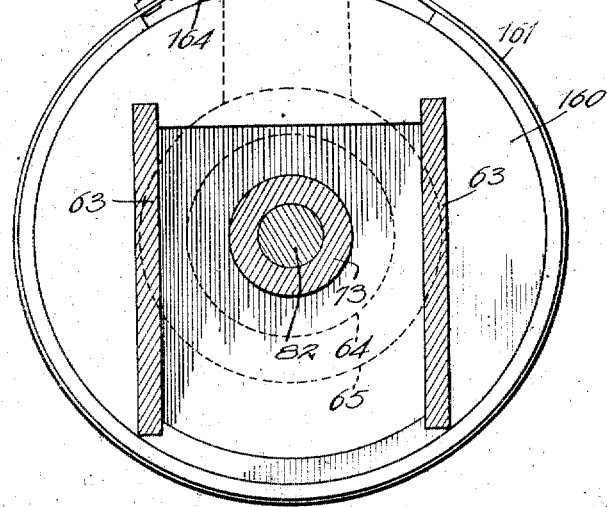

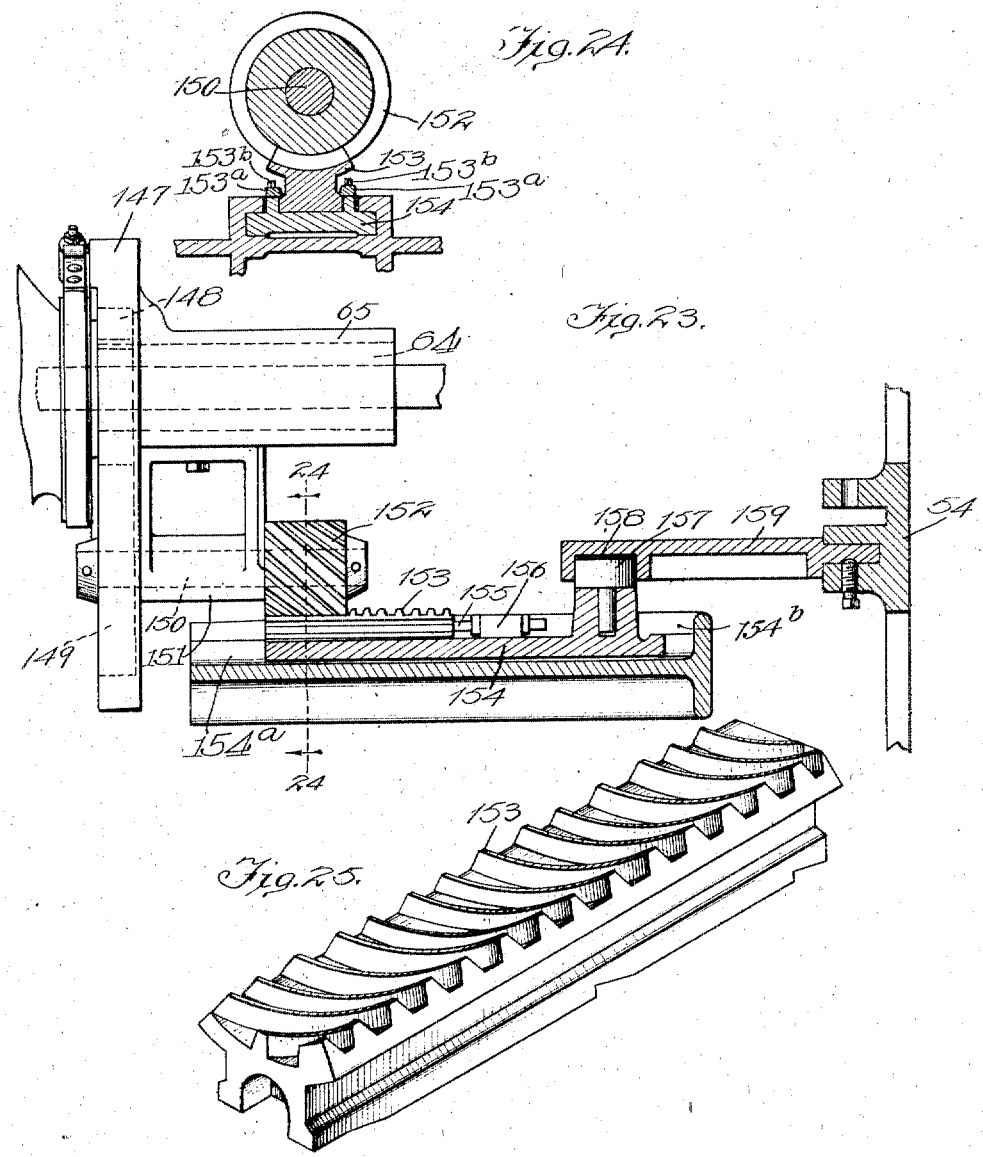

A. KADOW.
GLASS BLOWING MACHINE.
APPLICATION FILED NOV. 18, 1912.
1,248,664.
Patented Dec. 4, 1917.
15 SHEETS—SHEET 9.
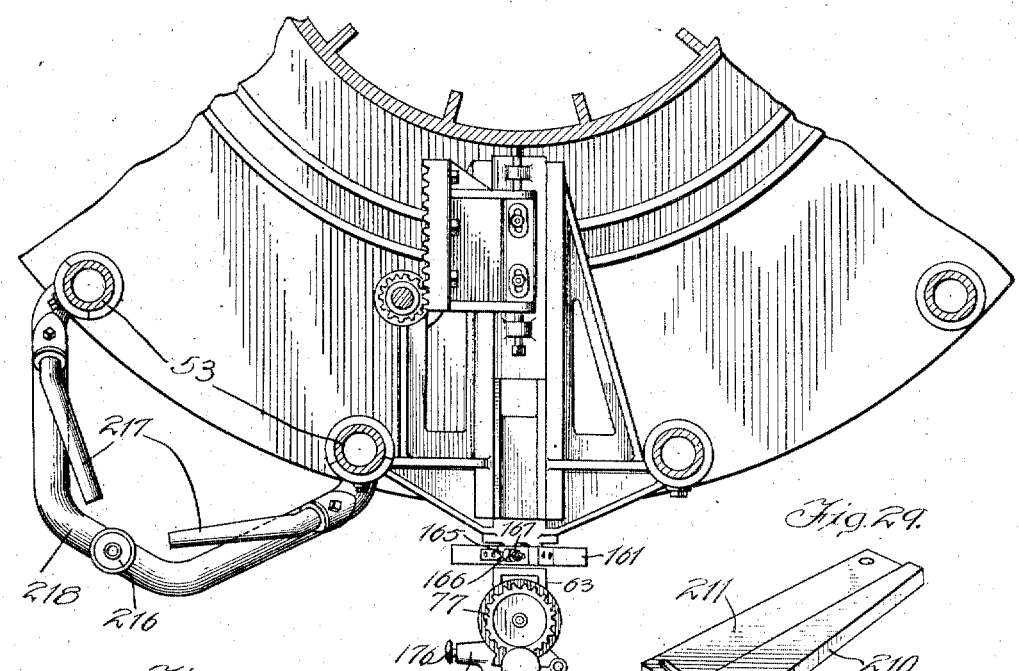
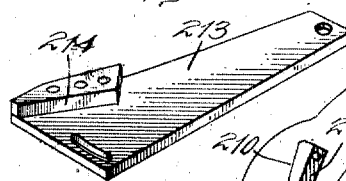
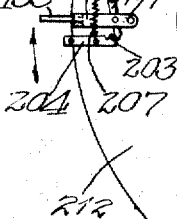
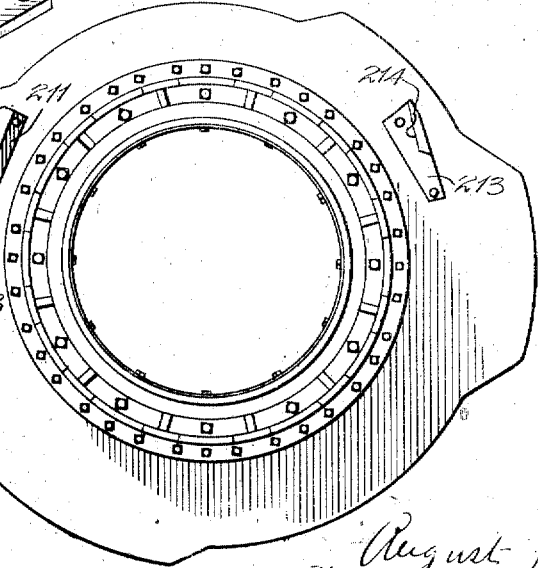
Witnesses:
R. Bauerle
W. Kilroy
Inventor:
August Kadow
By Barnett & Truman
Attys.

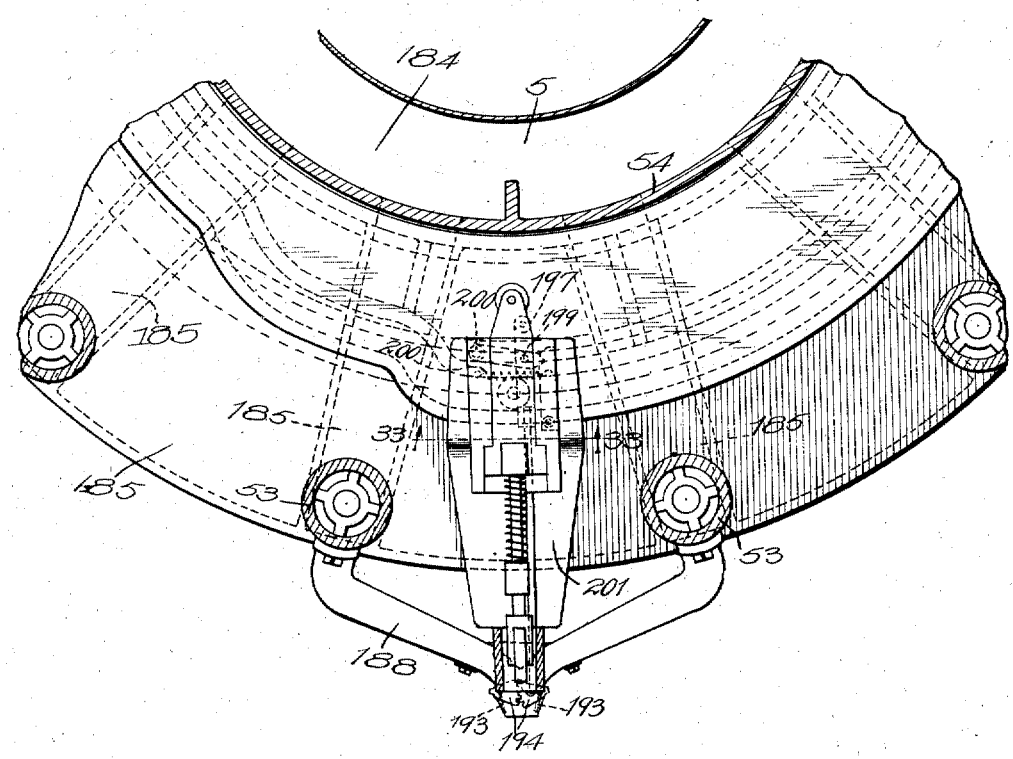
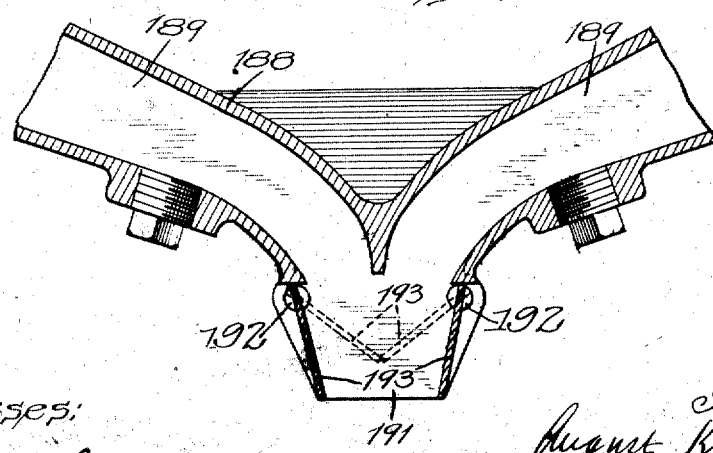

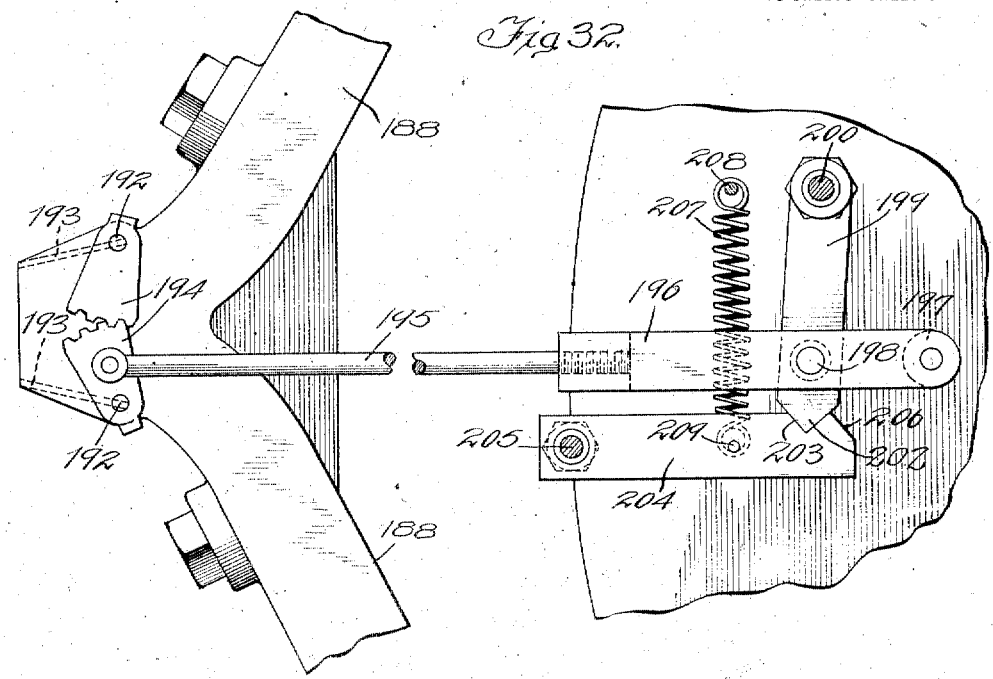
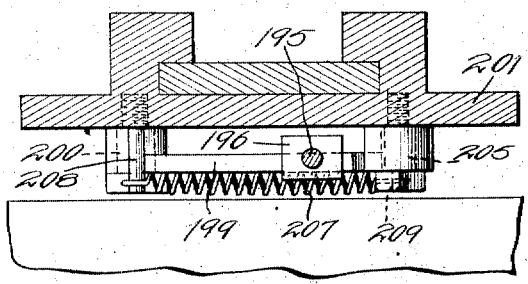
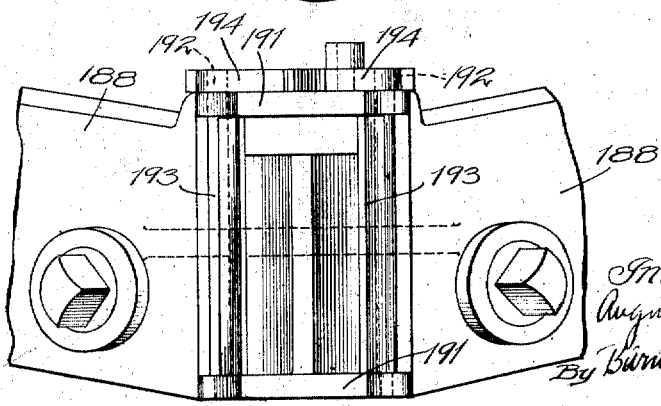

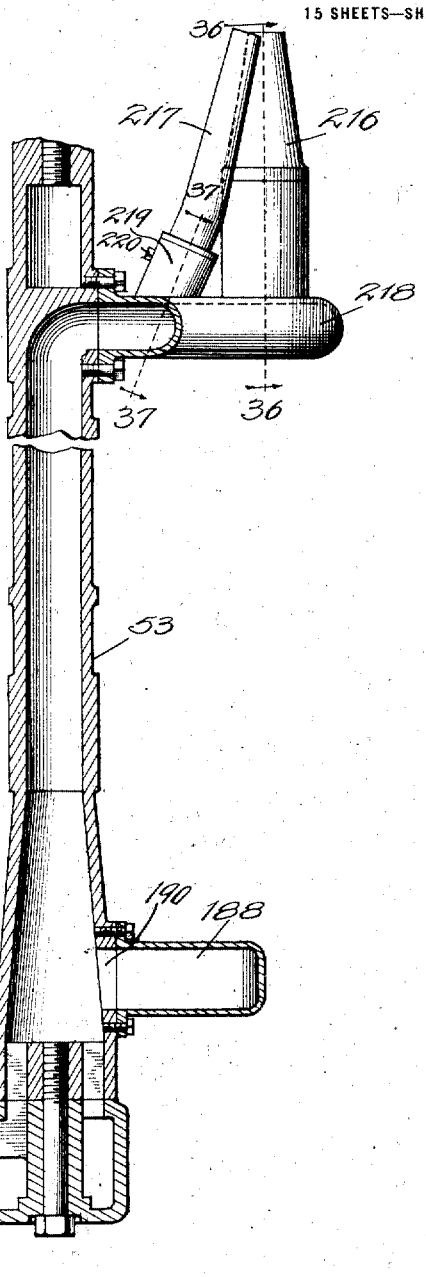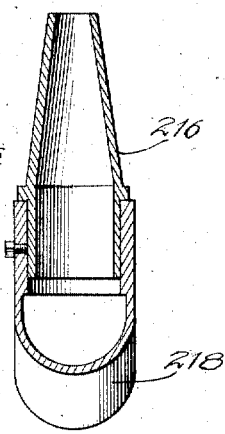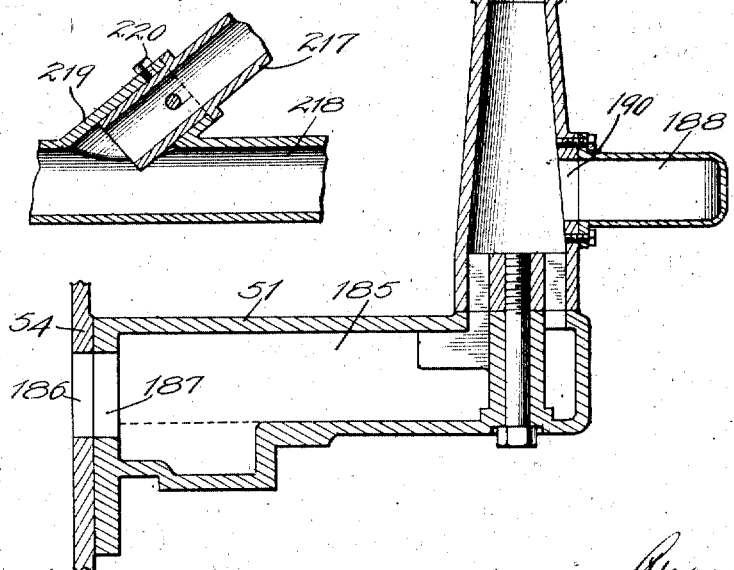

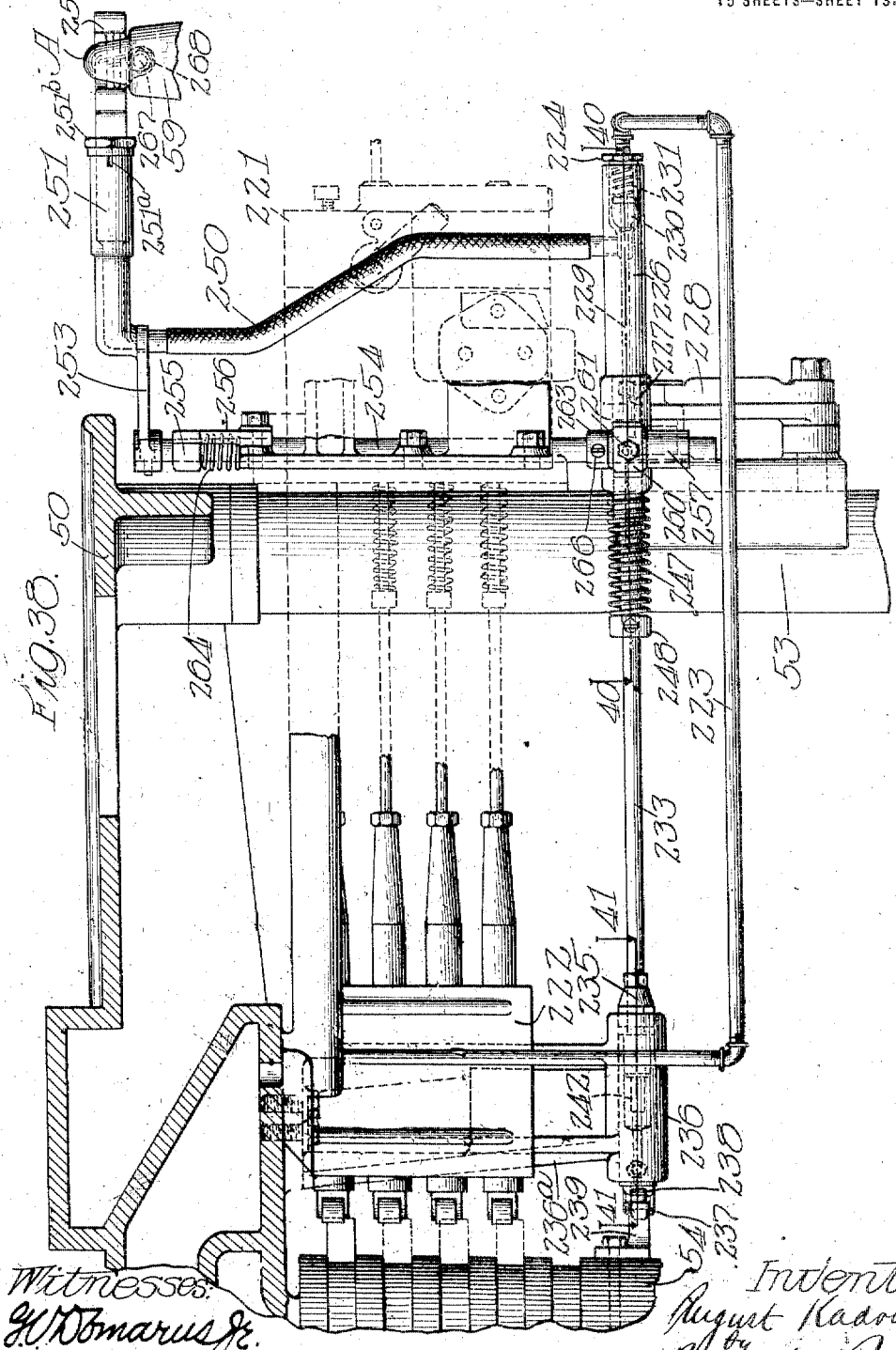

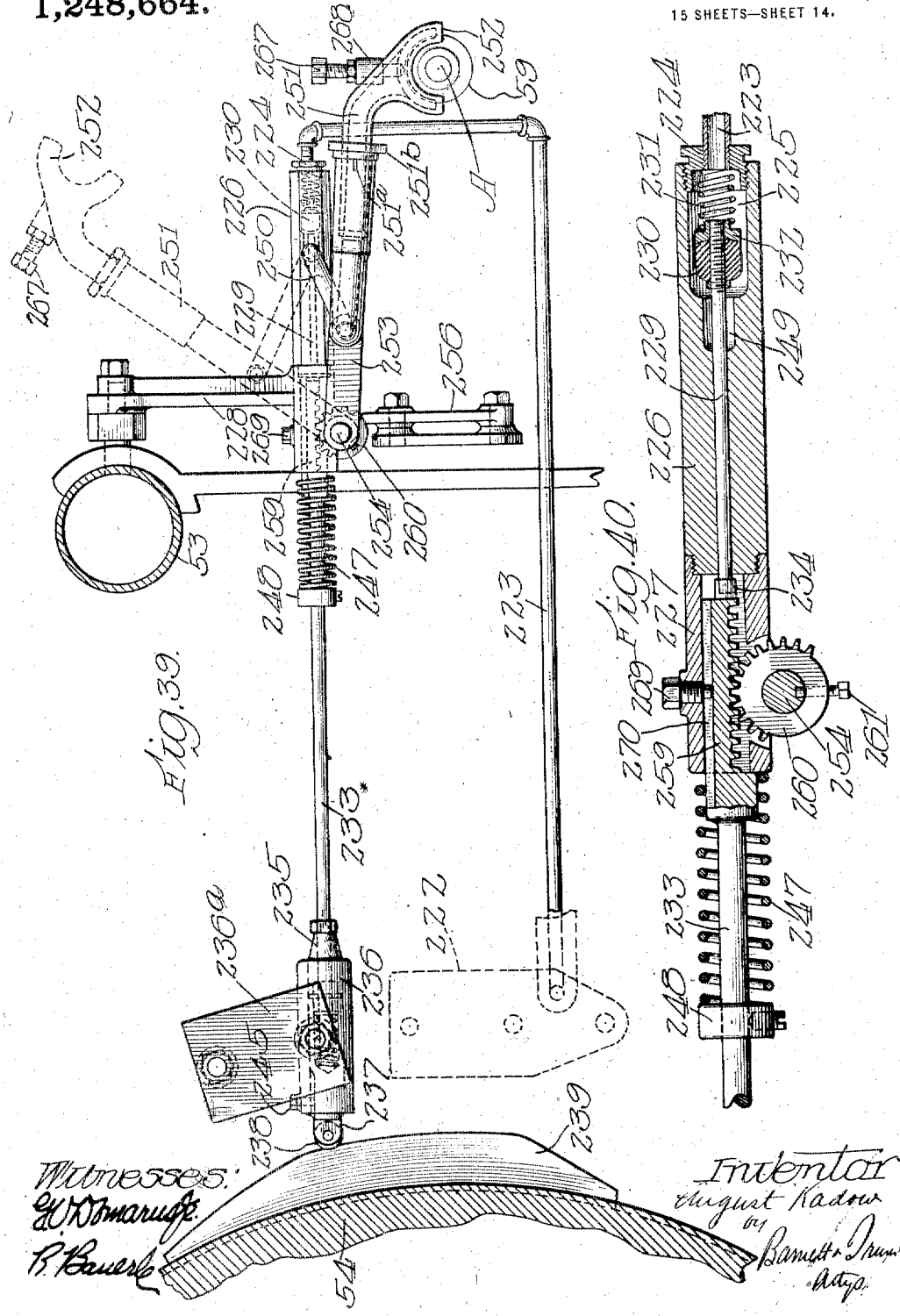

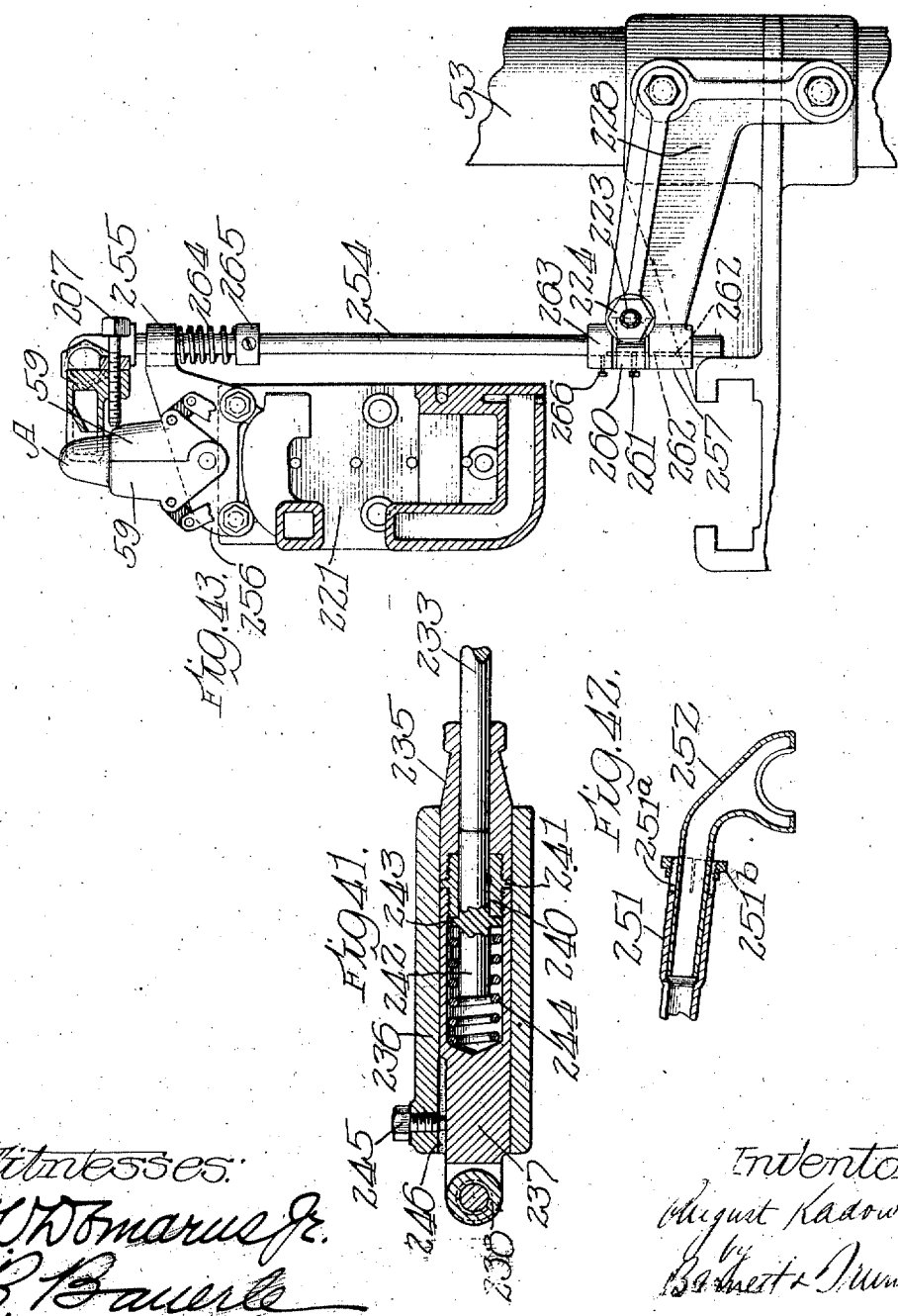

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

GLASS-BLOWING MACHINE.

1,248,664.   Specification of Letters Patent.   Patented Dec. 4, 1917.

Application filed November 18, 1912. Serial No. 731,956.

*To all whom it may concern:*

Be it known that I, AUGUST KADOW, a citizen of the United States, residing at Toledo, in the county of Lucas and State of Ohio, have invented certain new and useful Improvements in Glass-Blowing Machines, of which the following is a specification.

My invention relates to glass blowing apparatus, and has for one of its primary objects to provide certain improvements in the construction of the spindle or glass blowing implement disclosed in my co-pending application Serial No. 628,226, filed May 19, 1911, and forming a part of the glass blowing machine shown and described as a whole in my co-pending application Serial No. 570,621, filed July 6, 1910, the first named application being a division of the latter, filed to cover particularly the construction of the spindle and the mechanisms employed for giving the spindle its various movements.

The improvements upon the spindle and its operating mechanism sought to be covered herein consist, among other features to be hereinafter more fully described, of certain novel arrangements and devices whereby the air has a clearer and more unobstructed passageway through the spindle, than in the original construction, whereby the movement of the various parts is made more positive and certain, whereby the tendency of certain parts of the spindle coming into contact with the blank to overcool the same in certain places is overcome whereby the air pressures delivered to the blank are more accurately controlled by preventing leakage, and whereby the structure and organization of the spindle are simplified and cheapened.

A further object of the invention is to provide the spindle with certain devices and structural arrangements by means of which the parts of the spindle adjacent the blank may be kept cool by the application of blasts of air.

A further object is to provide bearings for the main shell or casing of the spindle of a character to permit the spindle to be quickly and conveniently dismounted from the machine if occasion require.

A further object is to make an improvement in the construction of the mechanism for oscillating the spindle in a vertical plane whereby these movements, which are relatively short and intermittent, will be accomplished more smoothly. The spindle is oscillated for the purpose of swinging out and elongating the blank, the oscillating movements being preferably accompanied by the introduction of compressed air into the interior of the blank. In the machine as originally constructed these movements were sometimes jerky with the result that the elongation of the blank took place unevenly and sometimes was overdone.

A further object of the invention is to modify the mechanism for swinging the spindle from its vertical position, with the blank upward, to the reversed position, so that it will be stopped momentarily preferably in a position a few degrees from the horizontal. It has been discovered, after considerable experiment, that better results are obtained under certain conditions, for reasons which will be hereinafter more fully explained, if the spindle, after it has received the blank, is turned into this position and revolved on its longitudinal axis, preferably with the admission of air to the interior of the blank, before it is turned so as to invert the blank and swing it out by the oscillating movements above mentioned.

The invention has for a further object to provide certain devices whereby the blank, when first received on the spindle, may be cooled by the application of air.

The invention has for further objects the other new and improved devices, arrangements and constructions relating to glass blowing mechanism shown in the drawings annexed hereto and which will be hereinafter fully described and claimed.

The invention is illustrated, in a preferred embodiment, in the accompanying drawings wherein—

Figure 1 is a fragmentary side elevation of a glass forming machine such as that shown in my application Serial No. 570,621 above referred to, provided with the improvements constituting the present invention.

Fig. 2 is an elevation of the same parts taken from the side.

Fig. 3 is a longitudinal sectional view of the spindle or glass blowing implement shown in inverted position, that is, with the blank downward.

Fig. 4 is an enlarged sectional plan taken on line 4—4 of Fig. 3.

Fig. 5 is a view, in perspective, of the plunger forming part of the spindle structure.

Fig. 6 is a longitudinal sectional view of the same.

Fig. 7 is a sectional plan taken on line 7—7 of Fig. 6.

Fig. 8 is a view, in perspective, of the separately formed metal tip of the plunger.

Fig. 9 is a view similar to Fig. 6 illustrating a modification.

Figs. 10, 11 and 12 are longitudinal sectional views taken through the outer end, middle portion and inner end, respectively, of the spindle.

Fig. 13 is a sectional view on line 13—13 of Fig. 10 and upon a similarly designated line on Fig. 14.

Fig. 14 is a fragmentary longitudinal sectional view taken on line 14—14 of Fig. 13, being at right angles to the plane of Fig. 10.

Fig. 15 is a sectional view taken on the lines designated 15—15 on Figs. 10 and 16.

Fig. 16 is a fragmentary longitudinal section taken on line 16—16 of Fig. 15.

Fig. 17 is a sectional view on the lines designated 17—17 on Figs. 11 and 18.

Fig. 18 is a fragmentary longitudinal sectional view on line 18—18 of Fig. 17.

Fig. 19 is a sectional plan illustrating particularly the cam governing the swinging movements of the spindle.

Fig. 20 is a vertical sectional view on line 20—20 of Fig. 1.

Fig. 21 is a fragmentary sectional plan on line 21—21 of Fig. 1 but omitting the spindle.

Fig. 22 is a sectional view on line 22—22 of Fig. 20.

Fig. 23 is a detail sectional view, in the same plane as Fig. 20, illustrating the mechanism employed for swinging the spindle.

Fig. 24 is a vertical sectional view taken on line 24—24 of Fig. 23.

Fig. 25 is a view, in perspective, of the worm rack forming a part of this mechanism.

Fig. 26 is a sectional plan taken on line 26—26 of Fig. 1.

Fig. 27 is a sectional plan on line 27—27 of Fig. 1, certain parts being omitted.

Figs. 28 and 29 are views, in perspective, of the valve operating cams shown in the preceding figure.

Fig. 30 is a sectional plan of the arrangements for air cooling the spindle.

Fig. 31 is a sectional plan on line 31—31 of Fig. 2.

Fig. 32 is a fragmentary plan view illustrating the mechanism for opening and closing the air valves shown in the preceding two figures.

Fig. 33 is a sectional plan on line 33—33 of Fig. 30.

Fig. 34 is a front view of the beforementioned air valves.

Fig. 35 is a vertical sectional view taken on line 35—35 of Fig. 1.

Figs. 36 and 37 are sectional views taken on lines 36—36 and 37—37, respectively, of Fig. 35.

Fig. 38 is a vertical sectional view showing the apparatus for cooling the blank after being deposited in the spindle.

Fig. 39 is a sectional plan of this apparatus.

Figs. 40 and 41 are detail sectional plans taken on lines 40—40 and 41—41, respectively, of Fig. 38.

Fig. 42 is a sectional plan of the air nozzle forming a part of this apparatus, and Fig. 43 is a fragmentary end elevation of the apparatus with certain parts shown in section.

Like characters of reference designate like parts in the several figures of the drawings.

The machine of which the devices constituting the present invention form a part, is designed particularly for forming glass vessels such as electric light bulbs by a series of automatically performed operations. It will be obvious, however, that the improvements of this invention are not necessarily limited to a machine for making electric light bulbs. The improvements concerned might be made use of in other sorts of automatic glass forming apparatus where similar conditions prevail.

*General organization of the machine.*

The illustrative embodiment of my invention as here shown is made up of a number of glass forming units arranged upon a framework consisting of an upper spider 50, a lower spider 51 and connecting columns 53. The framework is rotatable around a stationary drum 54. Each unit consists of a gathering mechanism 55 which is adapted to be thrust into the working opening of a glass furnace, a spindle which is designed to receive the body or blank of glass collected by the gathering mechanism, means for introducing compressed air into the blank through the spindle, a mold 56 in which the finishing operation on the article is performed, and certain mechanisms actuated, in a large part, by cams on the stationary drum for causing the gathering mechanism, spindle and blank to perform the required operations necessary for the production of the finished article.

This invention concerns more particularly the construction of the spindle and certain mechanisms associated therewith.

*The spindle movements.*

An understanding of the construction of the spindle and its actuating mechanisms will be facilitated by a correct apprehension of the movements which the spindle is required to make and the operations that are performed thereby.

At the beginning of each cycle of operation the spindle is in vertical position with the end adapted to receive the blank turned upward, that is, it is in a position just the reverse of that shown in Figs. 1 and 2 of the drawings herein. The spindle stands directly under the blank mold 57 of the gathering mechanism, the spindle and gathering mechanism having been brought into alinement by certain mechanisms such as those shown in my application 570,621 which need not be here described.

Beginning with this position of the parts the following movements and operations are performed by the spindle:

(1) Preferably the spindle is first raised bodily toward the gathering mechanism.

(2) The blank holder 58 at the outer—that is, in this position of the spindle the upper—end of the spindle is lowered and the jaws 59 opened out. The blank is discharged from the blank mold of the gathering mechanism and received into the space between the open jaws 59.

(3) The jaws 59 are closed and the blank holder 58 is thrust upward so that the blank is firmly gripped between these parts.

(4) The spindle is lowered bodily so that the blank will clear the gathering mechanism.

(5) The plunger 60 is thrust into the inner end of the blank for the purpose of giving the blank a firm set in the holding devices and for other reasons.

(6) The plunger 60 is withdrawn and air forced into the blank through the spindle. At the same time certain portions of the spindle are preferably rotated on the longitudinal axis of said spindle so as to revolve the blank.

(7) The spindle is then turned to a position preferably a trifle oblique to the horizontal, with the blank holding end pointing upward, this position being shown in dotted lines in Fig. 1: the revolution of the spindle on its longitudinal axis and the admission of air preferably continuing while the spindle is in this position.

(8) The spindle is then inverted, that is, turned with the blank downward and in this position is swung back and forth. The rotation may stop but the admission of air may intermittently or otherwise continue. This operation elongates the blank.

(9) The oscillating movements of the spindle cease, leaving the spindle in a vertical position with the elongated blank downward. The blank mold 56 closes around the blank and the blank is revolved by the revolution of certain parts of the spindle on the longitudinal axis thereof.

(10) The blank mold opens and is lowered to clear the blank, the blowing of which has now been completed.

(11) The jaws 59 are opened out so that the blank is discharged from the spindle.

(12) The blank holder 58 and the jaws 59 resume their closed position and the spindle is turned one hundred and eighty degrees to the originally described position with the blank holding end upward.

In general, the movements above described are the same as those performed by the spindle disclosed in my pending applications above referred to except that the machine described in said applications did not provide for moving the spindle to and holding it in the oblique and intermediate position described in paragraph (7).

*The spindle.*

The operative parts of the spindle are contained in and attached to or built upon a cylindrical casing or shell consisting of a main casing 61 and an outer casing 62 rigidly secured one to the other. The main casing 61 is slidably mounted in bearings provided on a yoke 63 (Figs. 2 and 20), the latter being formed with a hub 64 which is rotatably mounted in a casting 65 secured to a pair of the upright columns 53.

Threaded on the casing 61 is a grooved collar 66 held in place by the lock nut 67. Mounted on a pivot 68 extending between the arms of the yoke 63 is a bell crank 69, one arm of which is in the form of a fork 70, the members of which are provided with rollers 71 extending into the groove of the collar 66. The other arm of the bell crank 69 consists of a fork 72 embracing the end of a sleeve 73 located within the hub 64 of the yoke 63. The extremities of the fork 72 are formed with slots 74 into which project pins 75 on the sleeve 73. The spindle is raised and lowered by reciprocating the sleeve 73 within the hub 74. The mechanism for accomplishing this is the same as that shown in my pending applications above referred to and need not be here described.

The inner end of the casing 61 (the terms "inner" and "outer" as applied to the spindle being used to designate the end at which the air is admitted and the blank holding end, respectively) is formed with gear teeth 76 which are meshed (Fig. 20) with a gear wheel 77 on a shaft 78 turning in a bearing 79 formed in the yoke 63. The opposite end of this shaft carries a bevel gear 80 meshed by a bevel gear 81 on a shaft 82 extending through the sleeve 73. The casing 61, 62 of the spindle is rotated on the longitudinal axis of the spindle by imparting rotary movement to the shaft 82. The mechanism for accomplishing this is the same as that shown in my pending applications above referred to and need not be here described.

The jaws 59 are pivotally mounted on hinge pins 83 (Figs. 2 and 10) on the outer section 62 of the main casing. The jaws are connected by links 84 to arms 85 formed on a sleeve 86 which surrounds the casing 62 and the upper part of the casing 61. A spiral spring 87 is interposed between a shoulder 88 on the sleeve 86 and a bearing ring 89 set against a shoulder 90 formed on the casing 61.

The blank holder 58 is secured to the end of a sleeve 91 which bears against, without being attached to a sleeve 92, the inner portion of which, designated 93, is reduced in diameter so as to provide a space for a spring 94. This spring bears upon a bearing ring 95 at the outer end of a hard metal bushing 96 which is secured to the interior of the shell 61 by screws 97. Secured to the reduced portion 93 of the sleeve 92 is a cylindrical hard metal element 98, the parts 92, 93, 98 forming a single rigid, hollow structure.

The plunger 60 is secured to the end of a hollow stem 99 carrying on its inner end a nut 100. A spring 101 is interposed between the nut 100 and a bearing ring 102 which stands against the end of the blank holder 58. Within the sleeve 91 is a hollow rod 103 carrying a nut 104 on its outer end. This rod extends through the hollow structure 92, 93, 98 and is anchored in a casting 105 slidably arranged in the end casing 106 of the spindle. The latter has secured thereto the hollow extension 107 which intervenes between the main casing 61 and the sleeve 98. A raceway is formed in the casing 106, extension 107 and sleeve 98, adapted to receive the balls 108. All of the parts of the spindle except the end casing 106, 107, casting 105 and hollow rod 103 rotate when the main casing 61 is rotated by means of the gear 77. A spring 109 is interposed between the casting 105 and a bearing ring 110 fitted against a shoulder 111 formed on the inside of the casing 106. The casting 105 has a neck 112 which projects through a slot 113 in the casing 106. The casting 105 is formed with a duct 114 which leads through the neck 112 to the bore of the hollow rod 103. A flexible hose 115 connects the duct in the neck 112 with a compressed air pipe 116 on the rotating frame of the machine (Figs. 1 and 2). The end casing 106 is kept from rotation by means of a roller 117 carried on the end of an arm 118 which is secured to the yoke 63 in which the spindle has its bearings.

The other structural features of the spindle can be best described in connection with the description of the operative movements of the several elements of the spindle.

Assuming the spindle to be in a vertical position with the blank receiving end uppermost, the blank holder 58 will be lowered and the jaws 59 opened by the following arrangements: The end of the casing 106 is provided with a projection 119 against the upper surface of which is brought to bear a fork 120 (Fig. 2) which, at the proper moment, is rocked on its pivot 121 by a certain train of mechanism shown and described in my prior applications above referred to, so that it need not be here described. The casing 106 is drawn downward and with it the sleeve 98, 93, 92. The sleeve 91 to which the blank holder 58 is attached and which rests upon but is not attached to the sleeve 92, follows after the sleeve 92 because of its gravity, until the shoulder 122 (Fig. 10) on the blank holder comes into contact with the upper end of the main casing extension 62 which limits the downward or inward movement of the blank holder.

Two pins 123 (Figs. 10, 15 and 16) extend through slots 124 in the sleeve 86 and through slots 125 in the main casing 61 and are fixed in the sleeve 92. The slots 124 are relatively short while the slots in the main casing 61 are considerably longer. When the sleeve 92 is drawn down far enough so that the pins 123 come to the bottom of the slots 124, which is after the blank holder 58 has dropped to its lower position, the sleeve 86 is drawn down with the sleeve 92. As the jaws 59 are linked to the sleeve by the links 84 the downward movement of the sleeve 86 throws the jaws open. The springs 94 and 87 are compressed when the sleeves 92 and 86 are drawn downwardly to open the jaws 59.

The blank A (Fig. 10) is discharged from the gathering mold 57 into the end of the spindle so that the flange or projection A' of the blank is supported upon the end of the blank holder 58. The fork 120 is rocked away from its engagement with the projection 119 on the casing 106 which allows the springs 94 and 87 to close the jaws 59. A further upward movement of the sleeve 92 and the sleeve 91, under the expansive action of spring 94, forces the blank holder 58 upward so that the flanged portion A' of the blank A is squeezed between the blank holder and the jaws. The purpose of this is, first, to firmly attach the blank to the spindle, and, second, to seal this connection against the escape of the compressed air subsequently admitted to the blank.

The spindle as a whole is then lowered so that the blank will clear the gathering mechanism; this movement being effected by a rocking movement of the bell crank 69 as previously described.

The plunger 60 is next thrust into the inner end of blank A. The purpose of this is, first, to make an indentation in the end of the blank which will center the compressed air and, second, to further insure the complete sealing of the blank to the end of the spindle. The plunger, it will be remembered, is secured to the end of a hollow rod 99 with which alines the hollow rod 103 secured to the air intake casting 105 in the casing 106. The spring 101 normally holds the plunger against a shoulder 129 formed on the blank holder 58. The casting 105 is formed with a stem 130 (Figs. 1, 2, 3 and 12) which projects through the cap piece 131 of the casing 106 and is provided with the hard metal tip 132. Mounted on a bracket 133 (Fig. 2) on the frame of the machine, is a lever 134 which, when the spindle is in the position just described with the blank uppermost, is adapted to be brought against the tip of the stem 131 so as to force the casting 105 upwardly in the casing 106 compressing spring 109. The mechanism for moving lever 134 is shown in my applications referred to and need not be described herein. The hollow rod 103 moves upwardly with the casting 105 until it comes into contact with the hollow rod 99 carrying the plunger 60 which it forces upwardly against the pressure of spring 101 so as to thrust the plunger into the blank. As soon as the lever 134 releases the stem 130 the springs 109 return the casting 105 and rod 103 to their normal position. The spring 101 acting on rod 99 retracts the plunger. By making the plunger operating rod in two sections a quick action is obtained so that the contact of the plunger with the blank is instantaneous and does not overcool the blank. If the rod be made in one piece its length makes it difficult to keep it true in its bearings.

The air is now admitted to the blank through the flexible tube 115 (Fig. 2), the port 114 in the casting 105, the hollow rods 103, 99, and through certain ports in the plunger 60 which will be described in connection with the description of the plunger. In order to prevent leakage of air from the spindle a packing 135 surrounds the upper end of the hollow rod 103 (Fig. 10), the packing being interposed between a nut 136, in the lower end of the sleeve 91, and a sliding collar 137 in said sleeve against which bears a spring 138 abutting against a shoulder 139 formed on the interior of the sleeve 91.

During this period the rotatable parts of the spindle may be rotated intermittently in opposite directions through the action of the gears, 76, 77 and the mechanism above mentioned for actuating the gear 77.

The spindle is then turned to a middle and preferably an oblique position with the end carrying the blank a few degrees above the horizontal by the mechanism which will be hereinafter described under the heading "Spindle swinging mechanism". The same mechanism is employed for inverting the spindle and then oscillating the same with the blank hanging downward. The blank is then inclosed in the blank mold 56 and rotated therein after which the mold is withdrawn and the finished bulb discharged by opening the jaws 59. The movements of the parts necessary for discharging the blank or the neck portion thereof are as follows:

A collar 140 is slidably arranged on the main casing 61 (Figs. 1, 2, 11, 17 and 18). The collar 140 is perforated and provided with bushings 141 to receive the ends of the screw pins 142 which pass through slots 143 in the main casing 61 and are screwed into the jaw-actuating sleeve 92. The same fork 120 (Fig. 2) which is rocked to engage the projection 119 on casing 106, when the spindle is in vertical position with the blank uppermost, is rocked so that it is brought to bear against the collar 140 when the time comes for discharging the blank from the spindle in its inverted position. The fork 120 bears against the under side of the collar 140, as shown in Fig. 2 and raises the collar, that is, moves it in a direction away from the blank. The pins 142 move through the slots 143 in the casing 61 but being fast to the sleeve 92, carry the sleeve 92 upward with them. The pins 123, previously referred to, are rigidly fixed to the sleeve 92, working in slots 125 in the casing 61. When the sleeve 92 moves upwardly these pins engage and move the sleeve 86, the slots 124 in which are shorter than the slots 125 in the casing 61. The movement of the sleeve 86 opens the jaws 59 so as to allow the blank to be discharged.

The sleeve 91 and the blank holder 58 attached thereto are kept from falling out of the spindle when the latter is in inverted position and the jaws are open by means of the screw pins 144 (Figs. 10, 13 and 14) which are fixed to the main casing 61, 62 and extend through slots 145 in the sleeve 86 and project into grooves 146 formed in the sleeve 91.

*The spindle swinging mechanism.*

These devices are shown particularly in Figs. 1, 2, 20, 22, 23 and 25.

The spindle, as above stated, is supported by a yoke 63, the hub 64 of which is rotatably mounted in a casting 65 secured to the frame of the machine. The casting is cored out to form a housing 147. Within this housing and keyed to the hub 64 is a gear 148 meshed with a gear 149 on a countershaft 150 mounted in bearings 151 in the casting 65. On the end of this countershaft is a worm pinion 152 which meshes with a worm rack 153 secured to a slide plate 154, by means of a screw 155 which is anchored in a lug 156 on the slide plate and by means of the clamping bars 153ª and screws 153ᵇ. The pitch surface of the rack 153 instead of being flat is curved on the same radius as the pinion 152. By this means back lashing as between the pinion and rack is practically eliminated. The slide 154 moves in guide slots 154ª formed in a member 154ᵇ forming part of the rotating frame of the machine and carries a roller 157 which travels with the rotation of the machine in a cam groove 158 formed in the cam plate 159 which is secured to the stationary drum 54.

I also preferably provide the yoke 63 with a brake which tends to make the oscillatory movements of the yoke and spindle smoother although this brake is not absolutely essential when the rack 153 has a curved pitch surface as above described. When this brake is employed the hub 64 is formed with a boss or brake drum 160 around which extends a band 161, one end of which is secured to a pin 162 fixed to a lug 163 on an arm 164 forming a part of casting 65, the other end being fastened to a threaded bolt 165 extending through a boss 166 formed on the lug 163, the bolt being adjustably anchored to the boss by means of the set nut 167.

The successive swinging movements of the spindle are best understood by reference to Fig. 19 which shows a plan view of the cam plate 159. When the roller 157 is at the point $a$ in the cam groove the spindle is in vertical position with the blank holding end uppermost. It remains in this position while the roller is traveling from $a$ to $b$. From $b$ to $c$, the cam takes an outward bend which causes the spindle to move to the oblique position shown in dotted lines in Fig. 1. The portion of the cam groove from $c$ to $d$ is concentric with the axis of the machine so that during this period of the travel of the roller 157 the spindle remains in the oblique position. The cam groove takes another outward bend from $d$ to $e$ which turns the spindle into vertical position with the blank downward. From $e$ to $f$ the cam groove alternately bends outwardly and inwardly. During this period the spindle is oscillated back and forth with the blank downward. From the point $f$ to the point $g$ the swinging movements are stopped, the spindle being in vertical position with the blank downward. During this period the blank is inclosed by the mold and afterward discharged from the spindle. From the point $g$ to $a$ the cam groove bends inwardly. This returns the spindle to its initial position with the blank holding end uppermost, completing the cycle of movements.

The spindle bearings.

My invention provides certain arrangements whereby the spindle may be quickly and conveniently dismounted from the machine without stopping the rotation of the latter and the operation of the other spindles carried by the machine. These arrangements are shown particularly in Figs. 1, 2 and 21. The yoke 63 which supports the spindle is provided with an upper and lower pair of webs 168 which, in each case, are connected by means of a semicylindrical web or half bearing 169. Pivoted to one of each pair of webs 168 by means of a pintle 170 is a semicylindrical bearing member 171 provided at the side opposite the hinge with lugs 172 formed with perforations 173 adapted to receive the locking pins 174, the latter being formed with stems 175 provided with buttons 176. The stems 175 are of reduced diameter in comparison with the locking portions of the pins and are surrounded by spiral spring 176ª. The locking pins engage sockets 177 formed in the webs 169. By disengaging the locking pins from the webs 169 the bearing members 171 may be swung outwardly so as to permit the removal of the spindle from the yoke 63.

The blank piercing plunger.

The plunger used for making an indentation in the inner end of the blank is preferably constructed as shown in Figs. 3 to 10, inclusive. This element consists of the body portion 60 and a separately formed tip 178. The body of the plunger is formed at one end with a threaded opening 179 into which is screwed the extremity of the hollow rod 99 and at the other, with a threaded opening 180 into which is screwed the stem 181 of the tip 178. The opening 179 communicates with a transverse passageway 182. Preferably grooves 183 are formed in the exterior surface of the plunger so as to give free passage for the compressed air from the passage 182 to the blank. The tip 178 may be made of metal or it may be made of graphite, as indicated at 178ª, Fig. 9. Originally the plunger was made of one piece of metal. It was found by experiment that the contact of the plunger with the blank tended to cool overmuch the surface it touched. It is essential that an indentation be made in the end of the blank in order to center the blast of air. However, it is equally important that the blank should not be overcooled at this point because this will increase the resistance which the blank offers to the air. The difficulty of overcooling is overcome in a large measure by making the tip of the plunger separate from the body. The plunger is necessarily cooled after each contact with the hot glass by the air which passes through the spindle. By making the tip relatively small and separate from the body of the plunger a certain amount of heat is retained in the tip. After the machine has been in operation for a short while this accumulated heat keeps the tip from overcooling the successive blanks with which it comes into contact. While I have gotten excellent results by using a separately formed tip made of metal, I deemed it preferable to make the tip of graphite. The graphite has a large thermal capacity and moreover is certain not to stick to the glass. When the tip is made of metal I prefer to use copper.

My present invention provides certain devices for subjecting the spindle and the blank mold to the cooling blasts of air while these parts are idle between successive operations. It also provides means which can be employed when occasion requires for cooling the blank immediately after it is delivered to the spindle.

*Spindle cooling devices.*

The arrangements for cooling the spindle, shown particularly in Figs. 1, 2, 27 to 34 inclusive and 35, will be first described. Within the central stationary drum 54 is an air trunk 184. The vertical columns 53 of the rotating framework of the machine are hollow and communicate with the air trunk through ducts 185 (Figs. 30 and 35) in the lower spider 51, the drum and spider being formed with the communicating ports 186, 187. Secured to the pair of vertical columns 53, to which is attached the spindle which has been heretofore described, is a hollow casting 188 formed with two branches providing a pair of ducts 189 which, at their inner ends, communicate with the interior of the columns through ports 190 with which said columns are formed and which come together and have a common discharge opening at the front of the casting. The casting 188 is formed above and below this opening with projecting lips 191 between which are pivoted the pintles 192 of the hinged valves 193 which are adapted to close the mouth of the casting 188.

The valves 193 are opened and closed by the following mechanism: Fixed to the pintles 192 are sector gears 194 which mesh one with another, to one of which is pivoted a rod 195 to the end of which is secured the extension piece 196 carrying at its extremity a roller 197. The extension piece 196 is pivotally connected by the pin 198 to a lever 199 pivotally mounted on a pin 200 on the under side of a plate 201 (Figs. 30 and 33) which is secured to and moves with the rotating frame of the machine. The end of the lever 199 is pointed, as indicated at 202, the point of the lever being adapted to fit into a notch 203 in the end of a latch bar 204 pivotally mounted on a pin 205 on the under side of the plate 201. The extremity of the latch bar is formed with the cam surface 206. The latch bar is drawn against the lever 199 by means of a spiral spring 207 engaging a pin 208 on the plate 201 and a pin 209 on the latch bar. In Fig. 27 the mechanism for operating the valve 193 is shown with its parts in the position which they assume when the valves are closed. The arrow in this figure indicates the direction of rotation of the frame of the machine and of the valve operating mechanism which travels therewith. At the proper moment, which is after the spindle has been brought in front of the mouth of the casting 188, the roller 197 comes into contact with the face 210 of a cam 211. This cam is secured to a stationary element 212 which, as shown, is the cam from which are actuated the movements of the blank mold 56. As the operation of the mold does not directly concern my present invention, the function of the cam 212 will not be further adverted to. When the roller 197 meets the cam surface 210 the connecting rod 195, 196, is thrust outwardly opening the valves 193. The point of the locking lever 199 rides over the cam surface 206 on the latch bar and drops into the notch in the edge of the latter, thus locking the valves 193 in their open position. Figs. 31 to 34 inclusive show the parts of this mechanism in the positions which they assume when the valves 193 are open. A closing cam 213 provided with the cam face 214 is secured to the mold operating cam plate 212 in position to close the valves 193 at the proper time. When the roller 197 meets the cam surface 214 the connecting element 195, 196 is drawn inwardly, the point of the locking lever 109 riding out of the notch in the latch bar. The engagement of the point of the lever with the cam surface 206 locks the valves 193 in the closed position. When the spindle is inverted the lower or blank holding end of the same is brought in front of the mouth of the casting 188. In order that the inclosed elements of the spindle may be cooled by the blast of air directed against the spindle, the portion of the sleeve 86 which surrounds the spring 87 is formed with perforations 86ᵃ.

*Blank mold cooling devices.*

The arrangements for cooling the blank mold are shown particularly in Figs. 1, 2, 26 and 35 to 37 inclusive. The blank mold while idle stands out of alinement with the spindle. The nozzles for cooling the blank mold are consequently arranged at one side of the spindle, being connected to one of the pair of columns 53 on which the spindle is supported and to the column next adjacent thereto in a direction away from the spindle, as is best shown in Figs. 1 and 26. The blank mold 57 has hinged thereto a bottom mold or cover 215 which is swung down away from the blank mold in order to deliver the blank to the spindle. The construction of the blank mold shown herein is described and claimed in my pending application Serial No. 719,178, filed September 7, 1912. The devices for cooling these parts consist of a vertical nozzle 216 which delivers air into the blank mold, and obliquely placed nozzles 217 which deliver air against opposite sides of the lower mold or cover 215. These nozzles are affixed to a hollow casting 218 which is secured to a pair of the hollow columns 53 of the machine as above described. The air passageway in the casting 218 communicates with the interior of the columns as shown in Fig. 35. The nozzles 217 are formed with bends, as shown, and their inner extremities are fitted into bosses 219 formed on the casting 218. The nozzles 217 are adjustably held in any desired position in the bosses by means of the set screws 220.

Blank cooling devices.

These devices are shown in Figs. 39 to 43 inclusive. Secured to the upper spider 50 of the machine and two of the columns 53 is an air controlling apparatus which is shown in Fig. 38 and designated as a whole by the numeral 221. The purpose of this apparatus is to automatically control the supply of air to the spindle. It forms the subject matter of my co-pending application Serial No. 719,865, filed September 11, 1912. This apparatus, which need not be described in detail herein, comprises an air chest 222 which is kept filled with compressed air. The air employed for cooling the blank after it has been deposited in the spindle jaws by means of the devices about to be described, is taken from this air chest. Obviously it might be derived from any other convenient source of supply. 223 designates a pipe leading from the air chest 222 and extending through a nipple 224 into a valve chamber 225 formed in a member 226 secured to the end of a housing 227 formed on a bracket 228 secured to one of the columns 53. The member 226 is formed with a bore in which is mounted the stem 229 of a valve, preferably a rubber ball valve, 230. A spring 231 intervenes between a washer 232 on the end of the stem 229 and the nipple 224. The valve 230 is unseated by means of a plunger 233 formed on one end with a socket 234 adapted to fit over the end of the stem 229. The other end of the plunger 233 extends loosely through a collar 235 which is slidable in a casing 236 supported by webs 236ª from the under side of the spider 50. In this casing is arranged a plunger 237 carrying on its outer extremity a roller 238 adapted to engage with a cam 239 on the stationary drum 54 of the machine. The plunger 237 is secured to the collar 235 by means of a coupling member 240 having an annular shoulder 241. The inner end of the plunger 237 is hollow and within the hollow part is a short plunger section 242 which abuts against the end of the plunger 233 and is provided with an annular shoulder 243 designed to bear against the coupling 240. A spring 244 is interposed between the plunger 237 and the shoulder 243 of the short plunger 242. The plunger 237 is held from rotation in the casing 236 and its movement outward from the casing is limited by a stud 245 which extends into a slot 246 in said plunger. A spring 247 is interposed between the housing 227 and a collar 248 secured to the plunger 233. When the plungers 237, 242, 233 are thrust forward by means of the cam 239 to unseat the valve 230 compressed air passes from pipe 223 and chamber 225 into a chamber 249 and from there through a flexible tube 250 to an air pipe 251. This air pipe is pivotally mounted and normally stands in the position indicated by the dotted lines in Fig. 39. At the time the valve 230 is unseated the air pipe 251 is given an angular movement to the position shown in the full lines in Fig. 39, bringing its nozzle 252 close up to the blank of glass A held in the spindle jaws. In the apparatus shown in the drawings the movement of the plungers 237, 242, 233 effects the swinging movement of the air pipe 251 as well as the unseating of valve 230. The air pipe 251 is carried on an arm 253 fixed on a vertical shaft 254 mounted in a bearing 255 formed on a bracket 256 secured to a part of the air controlling apparatus 221 and in a bearing 257 formed on the aforementioned bracket 228. The nozzle 252 has a stem which fits into the pipe 251 and is curved at its delivery end so that it extends around the blank A. The end of pipe 251 is formed with longitudinal slots 251ª and is clamped to the nozzle by the nut 251ᵇ. The portion of the plunger 233 which is within the housing 227 is in the form of a rack 259. The rack meshes with a pinion 260 keyed to the shaft 254 by means of a stud 261 which extends through the pinion into a slot 262 in the shaft. The pinion 260 is supported on the bearing 257. On the shaft 254 is a collar 263 which bears upon the pinion. A spring 264 is interposed between the bearing 255 and a collar 265 on the shaft. The collar 263 is fixed to the shaft by means of a set screw 266. By adjusting this collar the vertical position of the air pipe 251 and its nozzle 252 may be adjusted. The nozzle is kept from coming into contact with the blank by means of a stop screw 267 threaded through a lug 268 on the under side of the nozzle. The plunger 233 is kept from rotation by means of a stud 269 which extends into a slot 270 in the top of the rack portion 259 of the plunger.

The operation of this apparatus is as follows: When in the rotation of the machine the roller 238 meets the cam 239 the plungers 237, 242, 233 are thrust outwardly, compressing the spring 247 and, through rack 259, giving a partial rotation to the pinion 260. This rocks the air pipe 251 from the position shown in the dotted lines in Fig. 39 to that shown in the full lines. The rocking movement continues until the stop screw 267 comes into contact with one of the spindle jaws 59. In the further movement forward of the plunger 237, if the cam require it, spring 244 is compressed, the plungers 242, 233 remaining stationary. The plunger 233 normally stands out of contact with the valve stem 229. After the plunger has moved a certain distance forward and the air pipe 251 has commenced to swing toward the spindle the socket 234 comes into contact with the stem 229 and unseats the valve. By this arrangement practically no air is wasted.

I claim:

1. In glass working apparatus, a plunger adapted to be brought to bear against a body of glass in plastic condition, comprising a body part of metal and a graphite tip.

2. In a glass blowing spindle, the combination with a casing, of blank holding means and a plunger for making an indentation in the blank comprising a body part and a separately formed tip of high thermal capacity.

3. In a glass blowing spindle, the combination with a casing, of blank holding means and a plunger for making an indentation in the blank comprising a body part of metal and a graphite tip.

4. In a glass blowing spindle, the combination with a casing, of blank holding means, and a plunger for making an indentation in the blank comprising a body portion formed with a longitudinal air duct and a transverse air duct with a threaded opening in the outer end, and a tip of high thermal capacity having a threaded stem adapted to be received in said opening.

5. In a glass blowing spindle, the combination with a casing, of blank holding means, a plunger, a hollow rod to which said plunger is affixed, and means for reciprocating said rod; said plunger being formed with a duct at its inner end, with a transverse duct communicating therewith, and with external grooves at the extremities of said transverse duct.

6. In a glass blowing spindle, the combination with a casing, of blank holding means, a plunger, a hollow rod comprising two separate rod sections arranged in alinement, the plunger being secured to the end of one of said sections, a spring which holds said plunger in retracted position, and means for forcing the other rod section against the section carrying the plunger.

7. In a glass blowing spindle, the combination with a casing, of blank holding means, a plunger, a rod comprising two separate sections arranged in alinement, the plunger being secured to the end of one of said sections, a spring which holds said plunger in retracted position, and means for forcing the other section against the section carrying the plunger.

8. In a glass blowing spindle, the combination with a casing, of blank supporting means, a plunger, a hollow rod comprising two rod sections arranged in alinement, to one of which sections the plunger is affixed, an inlet casting to which the other section is secured, springs which hold said rod sections in retracted position, and means for moving said inlet casting so as to force the plunger into contact with the blank.

9. In a glass blowing spindle, the combination with a casing, of a hollow blank holder, jaws which secure the blank to said holder, a plunger in said blank holder, a hollow rod comprising two sections arranged in alinement, to one of which said plunger is secured, an inlet casting to which the other rod section is secured, springs which hold said rod sections in their retracted position, and means for moving the inlet casting so as to force the plunger into contact with the blank.

10. In a glass forming machine, the combination with a supporting frame, of a spindle, a spindle carrying element pivotally mounted on said frame, means for oscillating said element on its pivot and a brake which bears against said spindle carrying element.

11. In a glass forming machine, the combination with a supporting frame, of a spindle, a spindle carrying element provided with a hub revolubly mounted in said supporting frame, a brake drum on said hub, and a band which surrounds said drum.

12. In a glass forming machine, the combination with a spindle, of a pivotally mounted spindle carrying element and automatic mechanism for rotating said element alternately in opposite directions to oscillate the spindle comprising a worm wheel and a longitudinally movable rack meshed with the worm wheel, the pitch surface of the worm wheel being concave on a radius the same as that of the worm wheel.

13. In a glass forming machine, the combination with a spindle, of a movable element on which said spindle is supported, means constituting an air duct having a discharge port adjacent the spindle, and means operated at predetermined positions of said supporting element for opening and closing said port.

14. In a glass forming machine, the combination with a revoluble frame, of a spindle having blank holding means at one end thereof movably mounted on said frame, means for moving said spindle into a vertical position with the blank holding means downward, means constituting an air duct having a discharge port in line with the blank holding end of the spindle when the spindle is in the position above described, and means operated at predetermined points in the rotation of the spindle for opening and closing said discharge port.

15. In a glass forming machine, the combination with a revoluble frame, of a spindle having blank holding means at one end thereof movably mounted on said frame, means for moving said spindle into a vertical position with the blank holding means downward, means constituting an air duct having a discharge port in line with the blank holding end of the spindle when the spindle is in the position above described, a valve to open and close said port, means operated at predetermined points in the rotation of the spindle for moving said valve, and means for locking the valve in the open and in the closed positions.

16. In a glass forming machine, the combination with means constituting an air duct having a discharge port, of a valve pivotally mounted in position to close said port, means for turning said valve on its pivot, and means for locking the valve in its open and in its closed positions.

17. In a glass forming machine, the combination with means constituting an air duct having a discharge port, of a valve pivotally mounted in position to close said port, an operating rod for turning the valve on its pivot, a cam for actuating the movements of said rod, a locking lever to which the rod is connected, and a latch which impositively engages with said locking lever so as to hold the valve in its open and in its closed positions.

18. In a glass forming machine, the combination with means constituting an air duct having a discharge port of a pair of valves pivotally mounted at opposite sides of said port, meshing sector gears on said valves, a rod engaged with one of said sector gears, cams with which the other end of the rod engages which are adapted to move the rod back and forth, a locking lever to which the rod is pivoted, a latch which engages the locking lever, and a spring arranged to hold the latch in engagement with said locking lever.

19. In a glass blowing spindle, the combination with a casing, of a hollow blank holding element movable with respect to said casing, a plunger within said element, a spring which holds said plunger in retracted position, and a rod separate from the plunger adapted to force said plunger into the blank.

20. In a glass blowing spindle, the combination with a casing, of a hollow blank holding element movable with respect to said casing and provided with an internal shoulder, a plunger in said hollow element, a spring adapted to normally hold said plunger in retracted position against said shoulder, and a rod separate from said piston adapted to force the piston into contact with the blank.

21. In a glass blowing spindle, the combination with a casing, of a hollow blank holding element movable with respect to said casing and provided with an internal shoulder, a plunger in said hollow element, a spring adapted to normally hold said plunger in retracted position against said shoulder, a rod separate from said piston adapted to force the piston into contact with the blank, said piston and rod being formed with bores, and an inlet casting to which the rod is secured having a duct communicating with the bore of said rod.

22. In a glass blowing spindle, the combination with an axially revoluble casing, of a hollow blank holding element movable longitudinally with respect to said casing and provided with an internal shoulder, a plunger in said hollow element, a spring adapted to normally hold said plunger in retracted position against said shoulder, a rod separate from the piston adapted to force the piston into contact with the blank, a member to which said rod is secured, said member, rod and plunger being formed with air ducts, and a spring which bears against said member so as to normally hold the rod in its retracted position.

23. In a glass blowing spindle, the combination with an axially revoluble casing, of a hollow blank holding element movable longitudinally with respect to said casing and provided with an internal shoulder, a plunger in said hollow element, a spring adapted to normally hold said plunger in retracted position against said shoulder, a rod separate from the piston adapted to force the piston into contact with the blank, a member to which said rod is secured, said member, rod and plunger being formed with air ducts, a spring which bears against said member so as to normally hold the rod in its retracted position, and a non-revoluble casing in which said member is movable longitudinally.

24. In a glass blowing spindle, the combination with an axially revoluble casing, of a non-revoluble casing secured at one end thereof, a blank holding element at the other end of said casing, a sleeve to which said element is secured, blank holding jaws pivotally mounted on said revoluble casing, a longitudinally movable sleeve provided with connections to said jaws, a sleeve within said revoluble casing which is arranged in alinement with the sleeve to which the blank supporting element is attached which is provided with connections with said non-revoluble casing and the sleeve with which the jaws are connected, a collar longitudinally movable on said revoluble casing provided with a connection to said last mentioned sleeve, a plunger in said blank supporting element, a hollow rod to which said plunger is secured, a second hollow rod in line with the first mentioned rod, a member movable in said non-revoluble casing to which said second mentioned rod is secured and provided with an air duct communicating with the bore of said rod, means for raising and lowering the revoluble casing, means for revolving the same on its longitudinal axis, means for moving the sleeve which controls the blank holding jaws, and means for moving the member to which the plunger operating rod is secured.

25. In a glass blowing machine, the combination with a spindle provided with glass holding means, of means automatically operated at intervals for directing drafts of air against the blanks successively held in said blank holding means.

26. In a glass blowing machine, the combination with a spindle provided with blank holding means, of an air pipe having an arcuate nozzle through which air is delivered against the blanks successively held in said blank holding means.

27. In a glass blowing machine, the combination with a spindle provided with blank holding means, of an air pipe having an arcuate nozzle through which air is delivered against the blanks successively held in said blank holding means, and an automatically operated valve for controlling the flow of air through said pipe.

28. In a glass blowing machine, the combination with a spindle provided with blank holding means, of a movably sustained air pipe having an arcuate nozzle through which air is delivered against the blanks successively held in said blank holding means, and means for moving said pipe into and out of operative position.

29. In a glass blowing machine, the combination with a spindle provided with blank holding means, of a movably sustained air pipe through which air is delivered against the blanks successively held in said blank holding means, and means for moving said pipe into and out of operative position.

30. In a glass blowing machine, the combination with a spindle provided with blank holding means, of a movably sustained air pipe through which air is delivered against the blanks successively held in said blank holding means, means for moving said pipe into and out of operative position, and a valve for controlling the flow of air through said pipe which is opened and closed with the movements of the pipe.

31. In a glass blowing machine, the combination with an axially revoluble spindle provided with blank holding means, of a movably sustained air pipe having a nozzle adapted to direct air against the blank in said holding means, and means for moving said air pipe into and out of operative position.

32. In a glass blowing machine, the combination with a rotary frame, of a spindle thereon provided with blank holding means, a pivotally mounted air pipe provided with a nozzle adapted to deliver air against the blanks in said holding means, and mechanism for swinging said air pipe into and out of operative position.

33. In a glass blowing machine, the combination with a rotary frame, of a spindle thereon provided with blank holding means, a pivotally mounted air pipe provided with a nozzle adapted to deliver air against the blanks in said holding means, mechanism for swinging said air pipe into and out of operative position, and a valve to control the flow of air through said air pipe.

34. In a glass blowing machine, the combination with a rotary frame, of a spindle thereon provided with blank holding means, a pivotally mounted air pipe provided with a nozzle adapted to deliver air against the blanks in said holding means, mechanism for swinging said air pipe into and out of operative position, and a valve to control the flow of air through said air pipe which is operated by the mechanism for swinging the air pipe.

35. In a glass blowing machine, the combination with a rotary frame, of a spindle thereon provided with blank holding means, a pivotally mounted air pipe provided with a nozzle adapted to deliver air against the blanks in said holding means, a stationary cam, and mechanism actuated by said cam for swinging said air pipe.

36. In a glass blowing machine, the combination with a rotary frame, of a spindle thereon provided with blank holding means, an air pipe provided with a nozzle adapted to deliver air against the blanks in said holding means, a valve to control the flow of air through said air pipe, a stationary cam, and mechanism actuated by said cam for operating said valve.

37. In a glass blowing machine, the combination with a rotary frame, of a spindle thereon provided with blank holding means, a movably sustained air pipe provided with a nozzle adapted to deliver air against the blanks in said holding means, a valve to control the flow of air through said pipe, a stationary cam, and mechanism actuated by said cam for moving said air pipe into and out of operative position and for operating said valve.

38. In a glass blowing machine, the combination with a rotary frame, of a spindle thereon provided with blank holding means, a pivotally mounted air pipe provided with a nozzle adapted to deliver air against the blanks in said holding means, a valve to control the flow of air through said pipe, a stationary cam and mechanism actuated by said cam for swinging said air pipe into and out of operative position and for operating said valve.

39. In a glass blowing machine, the combination with a rotary frame, of a spindle thereon provided with blank holding means, a movably sustained air pipe provided with a nozzle adapted to deliver air against the blanks in said holding means, a valve to control the flow of air through said pipe, a stationary cam, and a spring pressed plunger operated by said cam for operating said valve and moving said air pipe into and out of operative position.

40. In a glass blowing machine, the combination with a rotary frame, of a spindle thereon provided with blank holding means, a movably sustained air pipe provided with a nozzle adapted to deliver air against the blanks in said holding means, a valve to control the flow of air through said pipe, a stationary cam, and a spring pressed plunger operated by said cam for operating said valve and moving said air pipe into and out of operative position, said plunger consisting of plunger sections elastically connected for the purpose described.

41. In a glass blowing machine, the combination with a rotary frame, of a spindle thereon provided with blank holding means, a pivotally mounted air pipe provided with a nozzle adapted to deliver air to the blanks in said holding means, mechanism for swinging the air pipe into and out of operative position, and an adjustable stop member on the nozzle adapted to abut said blank holding means.

42. In a glass blowing machine, the combination with a rotary frame, of a spindle thereon provided with blank holding means, a pivotally mounted air pipe provided with a nozzle adapted to deliver air to the blanks in said holding means, mechanism for swinging the air pipe into and out of operative position, and an adjustable stop member on the nozzle adapted to abut said blank holding means, said pipe swinging mechanism comprising a member consisting of two parts elastically connected for the purpose described.

43. In a glass blowing machine, the combination with a rotary frame, of a spindle thereon provided with blank holding means, a pivotally mounted air pipe provided with a nozzle adapted to deliver air to the blanks in said holding means, mechanism for swinging the air pipe into and out of operative position, and an adjustable stop member on the nozzle adapted to abut said blank holding means, said pipe swinging mechanism comprising a plunger consisting of plunger sections collapsible and elastically connected for the purpose described.

44. In a glass blowing machine, the combination with a revoluble spindle provided with blank holding means, of means for delivering a blast of air against the blanks in said holding means, and means for revolving the spindle.

45. In a glass blowing machine, the combination with blank holding means, of a movable air pipe adapted to deliver air against the blanks in said holding means, means for positioning said pipe in its operative position, and mechanism for moving said air pipe into and out of its operative position comprising members yieldingly connected for the purpose described.

46. In a glass blowing machine, the combination with blank holding means, of a pivoted air pipe adapted to deliver air against the blanks in said holding means provided with a pinion, an adjustable stop member on said pipe adapted to abut against the blank holding means, a plunger provided with a rack meshing with said pinion, and a cam to actuate said plunger, said plunger comprising collapsible plunger sections.

47. In a glass blowing machine, the combination with blank holding means, of a pivoted air pipe adapted to deliver air against the blanks in said holding means provided with a pinion, an adjustable stop member on said pipe adapted to abut against the blank holding means, a plunger provided with a rack meshing with said pinion, a cam to actuate said plunger, said plunger comprising collapsible plunger sections, and a valve for controlling the flow of air through said pipe provided with a stem against which said plunger is adapted to abut when moved to bring the pipe into operative position.

48. In a glass blowing machine, the combination with blank holding means, of a movable air pipe adapted to deliver air against the blanks in said holding means, mechanism for moving said pipe into and out of operative position, and a valve to control the flow of air through said pipe which is operated by said mechanism.

49. In a glass blowing machine, the combination with blank holding means, of a movable air pipe adapted to deliver air against the blanks in said holding means, mechanism for moving said pipe into and out of operative position, and a valve to control the flow of air through said pipe which is opened and closed just as the air pipe reaches and is moved away from its operative position.

50. The combination with a traveling frame, of a glass blank receiving device carried by said frame, an air nozzle, means for supplying air under pressure to said nozzle, and means for periodically and at distinct intervals swinging said air nozzle to a position to direct a current of air against the plastic blank in said blank receiving means.

51. The combination with a traveling frame, of mechanism carried thereby and actuated by the travel thereof to receive a plastic glass blank, an air nozzle carried by said frame, means for supplying air under pressure to said nozzle, and means actuated by the travel of said frame to periodically swing said air nozzle to a position to direct a current of air against the expanded portion of the blank carried by said blank receiving means, and to then swing the air nozzle back to its original position.

AUGUST KADOW.

Witnesses:
E. J. MARSHALL,
GEORGE E. DIXON.

It is hereby certified that in Letters Patent No. 1,248,664, granted December 4, 1917, upon the application of August Kadow, of Toledo, Ohio, for an improvement in "Glass-Blowing Machines," an error appears in the printed specification requiring correction as follows: Page 10, lines 70, 71, 81, 82, 83, 95, 96, 110, 111, claims 20, 21, 22, and 23, for the word "piston" read *plunger;* and that the said Letters Patent should be read with this correction therein that the same may conform to the record of the case in the Patent Office.

Signed and sealed this 26th day of February, A. D., 1918.

[SEAL.]

F. W. H. CLAY,

*Acting Commissioner of Patents.*

Cl. 49—20.